United States Patent [19]
Brown

[11] 3,812,654
[45] May 28, 1974

[54] METHOD AND APPARATUS FOR REMOVING PRODUCTS OF COMBUSTION FROM A STREAM OF GASEOUS FLUID

[76] Inventor: Kenard D. Brown, 1227 S. Willow St., Casper, Wyo. 82601

[22] Filed: Mar. 2, 1972

[21] Appl. No.: 231,148

[52] U.S. Cl............................. 55/92, 55/93, 55/223, 55/226, 55/233, 55/247, 110/8, 184/6, 261/93, 261/96, 415/60, 415/72, 415/110
[51] Int. Cl............................................. B01d 47/02
[58] Field of Search......... 55/84, 86, 89, 90, 92–95, 55/223, 226, 227, 228, 230, 233, 234, 244, 247, 248, 250, 255, 256, 259; 110/8; 261/93, 96; 415/60, 72, 110; 184/122, 6

[56] References Cited
UNITED STATES PATENTS

| | | | |
|---|---|---|---|
| 140,808 | 7/1873 | Bennett............................. | 415/72 |
| 2,143,015 | 1/1939 | Kleinschmidt....................... | 261/96 |
| 2,228,425 | 1/1941 | Venderbush......................... | 415/60 |
| 2,480,095 | 8/1949 | Buchi................................ | 415/110 |
| 2,627,164 | 2/1953 | Halpern............................. | 415/72 |
| 3,204,861 | 9/1965 | Brown............................... | 202/163 |
| 3,442,603 | 5/1969 | Lazaros............................. | 55/224 |
| 3,581,473 | 6/1971 | Ririe, Jr............................ | 55/256 |
| 3,713,277 | 1/1973 | Sackett, Sr......................... | 55/223 |
| 3,714,764 | 2/1973 | Gething............................. | 55/235 |

FOREIGN PATENTS OR APPLICATIONS

| | | | |
|---|---|---|---|
| 1,363 | 0/1907 | Great Britain..................... | 55/247 |

*Primary Examiner*—Bernard Nozick
*Attorney, Agent, or Firm*—Wm. Griffith Edwards

[57] ABSTRACT

An apparatus for removing particulate matter and other constituents from a stream of combustion products comprises a vacuum pump of the liquid vortex type connected to receive the products of combustion and to drive them through a liquid vortex into a tank of liquid to remove most of the particulate matter; gases are collected above the liquid and are discharged through a liquid and gas treating stack to remove any remaining particulate matter and various other components of the combustion fluid stream. The pump is provided with a two stage rotor, the first stage is the gas compressing and mixing stage and the second stage the liquid vortex stage. Balancing of the pump rotor and minimizing of vibration are facilitated by a pressurized lubricant suspension and distribution system for the rotor shaft and bearings. The apparatus is effective to remove particulate matter and gaseous products from a wide range of combustion product sources and other contaminated gaseous fluid sources.

A gas purifying method is disclosed whereby particulate matter and undesired constituents of the gas are removed by first mixing the gas with water or other liquid and then introducing the mixture to the liquid vortex of a vortex pump, releasing the gas to a body of liquid, maintaining the gas above liquid at a pressure higher than atmospheric, thereafter passing the gas through a column of liquid to maintain the liquid in the column and treat the gas thereby.

30 Claims, 16 Drawing Figures

METHOD AND APPARATUS FOR REMOVING PRODUCTS OF COMBUSTION FROM A STREAM OF GASEOUS FLUID

My invention relates to methods and apparatus for removing particulate matter and other undesirable constituents from streams of combustion products and the like. The present invention is an improvement on the invention described and claimed in my Pat. No. 3,204,861 issued Sept. 7, 1965.

The elimination of the discharge of noxious fumes and particulate matter to the atmosphere has become a major problem in programs intended to reduce air pollution. Living conditions in cities and industrial areas are affected by the masses of foreign matter in the air. Toxic fumes may be present in substantial quantities, and the particulate matter changes the light and heat transmitting characteristics of the atmosphere. Much effort is now spent in attempting to control the accumulation of polluted air or "smog", particularly in densely populated areas. Various types of filtering and precipitating apparatus have been devised for removing particulate matter from the gaseous fluids emitted by incinerators, furnaces and other industrial plants. This apparatus has met with some degree of success but has not been found fully effective for all applications. It is desirable to provide highly efficient, rugged and easily maintained apparatus for removing undesired gaseous and solid matter from the discharge of industrial plants and other sources. Accordingly, it is an object of my invention to provide an improved apparatus for removing noxious gaseous, liquid and solid matter from smokestacks and other discharge outlets of combustion equipment and the like.

It is another object of my invention to provide a mechanical apparatus including an improved arrangement for removing both gaseous and particulate matter from waste discharge streams.

It is another object of my invention to provide an improved and highly effective apparatus for removing smoke and other particulate matter from combustion gases.

It is a further object of my invention to provide a vacuum pump of the liquid vortex type including an improved arrangement for minimizing vibration during operation.

It is a further object of my invention to provide an apparatus for purifying gaseous discharge streams carrying noxious waste matter and utilizing a vacuum pump of the liquid vortex type to collect and treat the gaseous discharge stream of combustion equipment and the like for removing particulate matter therefrom.

It is a still further object of my invention to provide an improved simple and rugged equipment for removing particulate matter from gaseous fluids and which may readily be utilized in a wide range of applications.

It is a still further object of my invention to provide an improved method for treating and purifying the gaseous streams discharged from industrial processes, combustion apparatus, burning materials and the like.

Briefly, in carrying out the objects of my invention in one embodiment thereof a liquid vortex vacuum pump of the general type disclosed and claimed in my above identified patent is provided with a rotor carrying two helical pumping elements arranged in a cylindrical shroud. The shroud is positioned in a closed tank below the level of water contained therein. The gas to be purified and a spray of water or other treating liquid mixed with the gas are admitted to the chamber about the first helical element. The two elements are spaced from one another, the second element being the liquid vortex forming rotor. The gaseous fluid is compressed and driven into the liquid vortex where a violent mixing action of gas and liquid under high pressure takes place and substantially all of the particulate matter is transferred from the gas to the liquid and remains in the water in the tank. Some of the constituents of the gas are also absorbed by or dissolved in the water and remain in the tank. The gaseous discharge from the tank is passed through a final purifying stage in a stack provided with screens supporting charcoal briquettes which are maintained covered with water, the gas being driven upwardly through the water. Purifying agents may be dissolved in the water to further treat the gas in the stack. The pump rotor is mounted on a tubular shaft provided with a bearing and pressure lubricating arrangement whereby the rotor "floats" on high pressure oil substantially throughout its length; this arrangement stabilizes the rotor of the pump which operates smoothly with minimum vibration regardless of the actual mechanical balance of the rotor.

The features of novelty which characterize my invention are pointed out with particularity in the claims annexed to and forming a part of this specification. The invention itself however both as to its organization and manner of operation together with further objects and advantages thereof will be best understood by reference to the following description taken in connection with the accompanying drawings in which:

Figure 1:
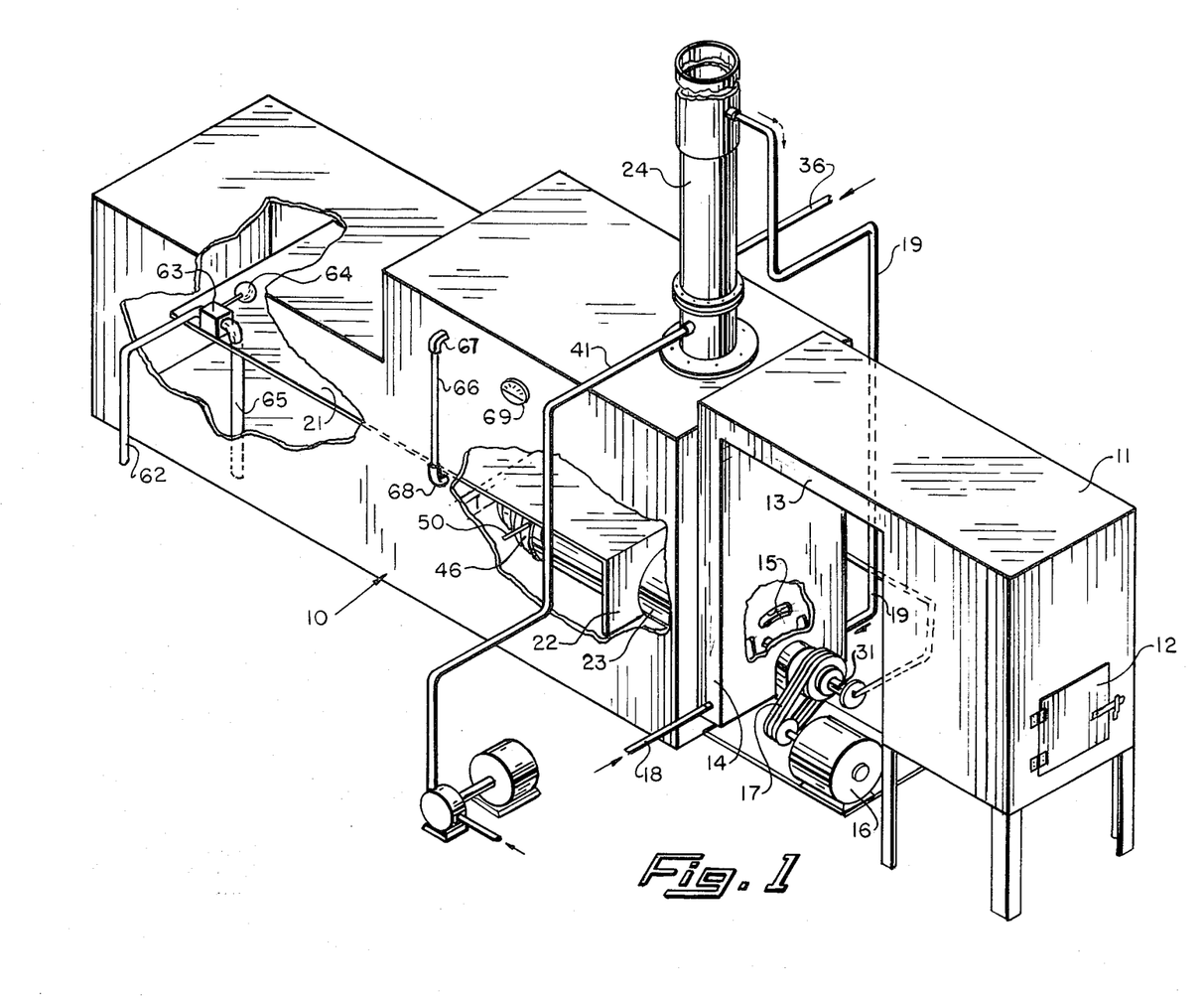
FIG. 1 is an isometric view partly broken away illustrating a vortex pump embodying my invention arranged to treat gases delivered from an incinerator.

Referring now to the drawings the apparatus illustrated in FIG. 1 comprises a vortex pump unit 10 arranged to receive the combustion gases from an incinerator 11, the bottom wall of which is a grating to admit air while supporting the material being burned. The material to be burned is charged into the incinerator through a door 12 and the smoke and fumes are removed from the incinerator through a horizontal duct 13 and a vertical duct 14 which is in communication with the intake of the vacuum pump thorugh a plurality of openings in the pump tank or housing one of which is illustrated at 15. The pump is driven by an electric motor 16 through V-belts 17 and water or treating fluid is supplied to the pump intake through conduits 18 and 19.

During operation the pump produces a vacuum on its intake side and the combustion gases are drawn into the pump where they are mixed with water supplied in a spray, the tank being filled with water to a level sufficient to submerge the pump. A horizontal baffle 21 may be mounted in the tank between the walls and above the pump and terminates in a vertical portion 22 which fits closely about the shroud of the pump indicated at 23. Thus fluids circulated by the pump are moved toward the far end of the tank where they pass around the baffle, gaseous constituents being collected above the water level in the tank. The operation of the pump is such that particulate matter in the combustion gases is mixed with the water and remains in the water where it settles toward the bottom or collects on the surface depending upon the characteristics of the material, its specific gravity and any tendency it may have to agglomerate. The gases discharged above the water level in the pump tank together with any remaining fine particulate matter are delivered to a stack 24 in which may be arranged further purifying equipment such as charcoal briquettes maintained in water or a treating solution through which the gas is passed.

Figure 2:
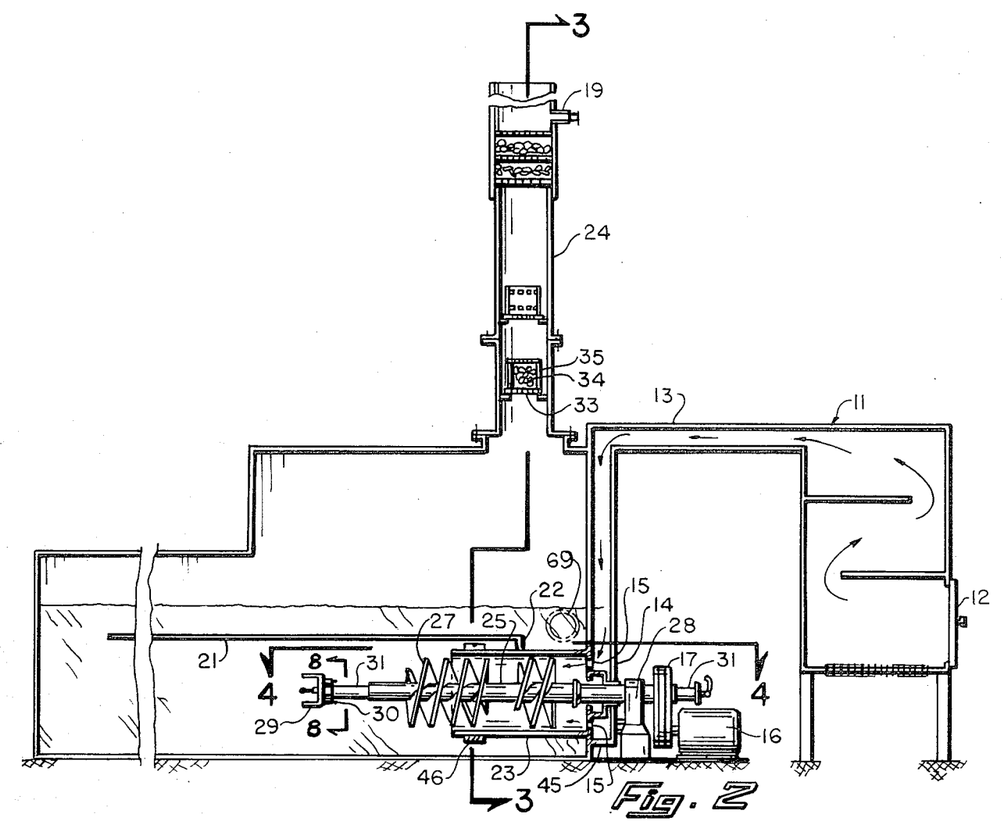
FIG. 2 is a longitudinal sectional view of the apparatus of FIG. 1.

The pump illustrated in FIG. 2 comprises a helical drive rotor mounted on a shaft 25 which is rotated by the motor 16 through the V-belts 17. The rotor includes a double helix portion 26 arranged within the intake zone of the pump and a vortex forming compression portion 27 arranged partly within the shroud 23 and partly axially outside the shroud. The rotor is supported between a mounting and thrust bearing 28 and a stationary channel iron support 29 which carries a stationary hollow shaft 31 secured to the support by a threaded nut 30; the shaft 25 extends beyond the bearing 28 and carries the sheave for the belts 17 and the stationary shaft 31 extends still farther beyond the right end of the assembly. The rotor 27 is also of double helical construction providing in effect two rotors spaced 180° from one another and each having a relatively long pitch. During operation of the vortex pump, a low pressure or vacuum is created in the right-hand or intake zone of the pump within the shroud 23 and a liquid vortex is formed within the rotor 27 which compresses the gases driven toward it by the rotor 26 and drives them into the liquid within the tank of the vortex pump unit 10. The level of the liquid in this tank may be maintained as desired but is such as to completely submerge the vortex pump and maintain a liquid level above the baffle 21 such as indicated at 32. The web of the channel iron support 29 is provided with elongated openings 29' on either side of the center to afford passage for the liquid stream from the pump.

The compressing action of the liquid vortex pump section produces a violent circulation of liquid in the tank and raises the vapor or gaseous pressure in the tank, a substantial quantity of the gases being dissolved or absorbed in the liquid, and the remaining vapors being discharged through the stack 24. A positive gas pressure substantially higher than atmospheric is maintained within the tank due to the fluid resistance within the stack 24 and may be further controlled by employing a weighted regulator valve of the flapper type as described hereinafter.

A substantial quantity of the gas driven into and absorbed or dissolved in the water in the tank is maintained in the water for a predetermined period because of the pressure maintained in the tank. The violent action of the vortex together with the agitation within the tank results in removing major quantities or particulate matter and various gases contained within the gas stream discharged from the incinerator 11 to the pump. The gases rising through the stack 24 are treated to remove any remaining particulate matter and undesired gaseous constituents. A column of water is maintained in the stack 24 to a level determined by the position of the outlet 19. During operation of the pump, gas is continuously delivered to the stack through a screen 33 which may be a copper plate provided with a multitude of holes and on which may be supported a body of charcoal briquettes, porcelain bodies or other chunks or pieces of material as indicated at 34, and which are contained within an open top cylinder 35. The chemical treating agent in the water solution which, for example, may be lime water for neutralizing acids, may be admitted to the tower through an intake 36 and flows upwardly around the cylinder 35 and thence over the top thereof and further moves on up through the stack 24 through a set of screens 37 supported on a foraminous copper plate 38, the screens being mounted within an open cylindrical tube 40 mounted on the plate 38 and extending above a fresh water inlet 41. The first section of the stack terminates in a section 42 which carries three screens or foraminous plates 43 between the middle plate and top plate of which are arranged stacks of charcoal briquettes 44. The height of a stack above the portion 42 is determined by the nature of the operation and the pressure balance desired within the system.

During the operation of the vortex pump system, the stack 24 is maintained filled with liquid between the screen 33 and the outlet 19 and the gas moves upwardly in a steady stream through this liquid in separate bodies or bubbles and is treated by the chemical content of the liquid as well as by passage over the copper screens and the charcoal briquettes. Overflow liquid from the outlet 19 is returned to the intake of the pump through the outlet 19 conduit which is connected to deliver the liquid to an annular manifold 45 and the intake of the pump.

Figure 4:
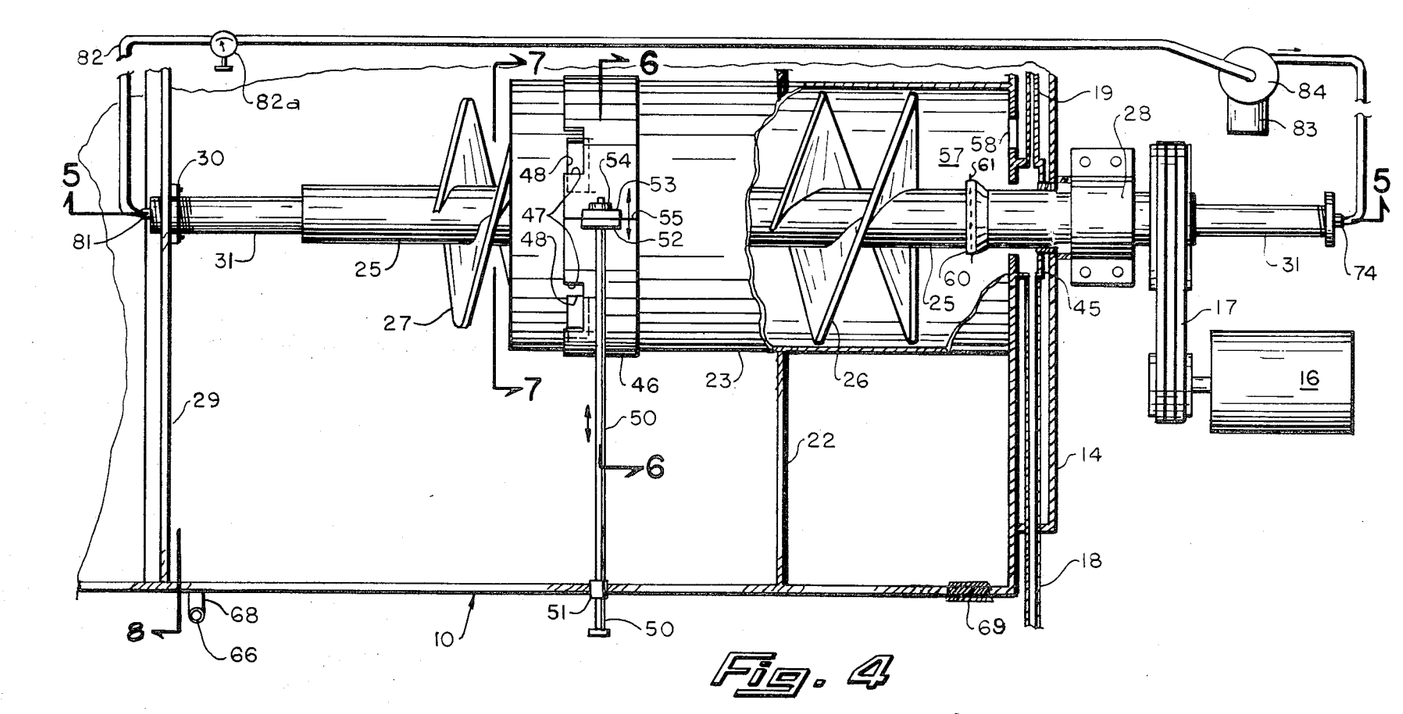
FIG. 4 is an enlarged top plan view partly in section and partly broken away illustrating the vortex pump construction.

The intensity of the vortex action of the pump may be adjusted by moving a band 46 arranged about the shroud 23 adjacent vortex impeller 27. As shown in FIG. 4, the band 46 is provided with lateral notches 47 which may be moved to selected positions over intake openings 48 in the shroud 23. The band may be rotated by forward or reverse pressure applied by a rod 50 extending tangentially of the band 46 and through the wall of the tank 10, a gland or seal 51 being provided to afford the sliding movement of the rod without leakage of liquid from the tank. The rod is attached to the band 46 in any suitable manner, such as by upturned flanges 52 and 53 formed on the band and having holes for passage of the rod and a nut 54 for securing the rod to the flanges while affording limited movement of the rod upon rotation of the band 46. Water from the tank 10 is recirculated to the interior of the shroud through the openings 48 and varies the intensity or mode of operation of the vortex in the manner described and claimed in my above identified Pat. No. 3,204,861.

As illustrated in FIG. 4, the hot products of combustion delivered to the vortex pump unit through the vertical duct 14 enter the intake zone of the vacuum pump indicated at 57 through a plurality of openings 58 in the end plate of the tank 10. The annular manifold 45 is also welded or otherwise suitably secured and bonded to the end plate of the tank and the water entering this annular manifold through the pipes 18 and 19 goes outwardly about the shaft 25 of the rotor through an annular clearance about the rotor. This produces a high velocity jet of water which is delivered against a slinger ring 60 which is provided with teeth 61 to further break up the water into small drops or particles. The gaseous matter and water mixed in the chamber 57 are driven by operation of the rotor 26 toward the rotor 27 and the vortex formed thereby and are compressed and thoroughly mixed with the water of the vortex and then discharged at the left-hand end of the shroud 23. The effect of the operation of the impeller 27 and the vortex action is to compress the gaseous components of the products of combustion and mix them thoroughly with the water within the vortex. This gas and liquid nixture under the pressure maintained within the tank 10 is agitated and soluble or otherwise absorbable constituents of the gaseous material are added to the water and thereby removed from the gaseous stream. Particulate matter in a similar manner is thoroughly mixed with the water and on flowing out of the shroud 23 circulates in the water and separates by gravity, some of the material floating and other material sinking. The accumulation of solid matter within the tank 17 depends upon the nature of the products of combustion delivered to the vortex pump and depending upon these materials, may sink quickly to the bottom or may be of a nature which tends to float to the top where it may agglomerate and can be removed by skimming off the agglomerated masses. An access opening having a removable cover may be provided to remove floating debris from the surface of the water. A drain plug, valve or clean-out door (not shown) is also provided at the bottom of the tank for affording removal of sludge and waste collected on the bottom of the tank.

The level of the liquid in the tank 10 is maintained by the discharge of liquid through an outlet conduit 62, controlled by a valve 63 actuated by float 64, the discharged water and solid matter therein entering from a point below the surface near the bottom of the tank as indicated by the lower end of an intake pipe 65 leading to the valve. For external observation of the level of the liquid, a gauge glass 66 may be provided on the side of the tank, it being connected to the interior of the tank through upper and lower elbows 67 and 68, respectively. A pressure gauge 69 is also provided to indicate the gas pressure above the water in the tank.

Figure 5:
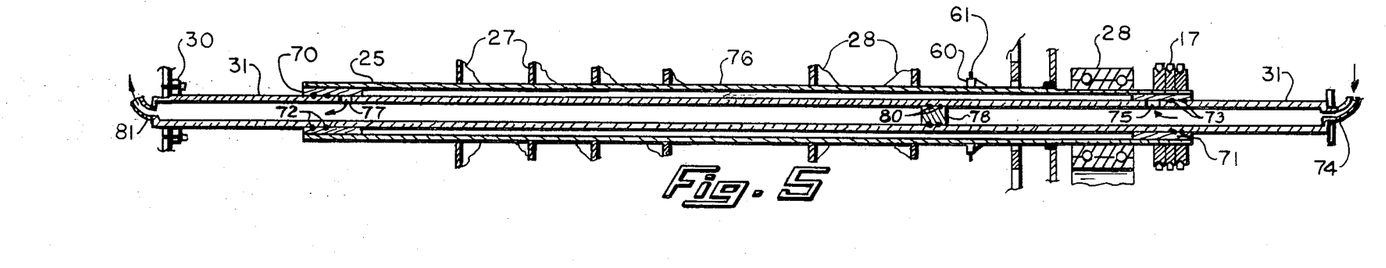
FIG. 5 is a longitudinal section view taken along the line 5—5 of FIG. 4.

As shown in the sectional view FIG. 5, the hollow shaft 25 of the rotor is mounted on the stationary tubular shaft 31 on sleeve bearibgs 70 and 71, a seal being provided between the bearings and the shaft 31 by pairs of O-rings 72 for the bearing 70 and 73 for the bearing 71. Oil for lubricating the bearings is admitted to the interior of the shaft 31 through an intake fitting 74 and flows from the interior of the fitting through an oil passage 75 into the space between the bearing 71 and the shaft 31, this space being of the order of 0.007 of an inch and affording a circulation of the oil betewen the bearing and the shaft. The oil then flows through an annular space between the two shafts, as indicated at 76, and flows out through a passage 77 after passing through the space between the bearing 70 and the shaft 31. Direct flow of oil through the center of the shaft 31 is prevented by a plug 78 secured by a suitable set screw (not shown) to the tube 31 and sealed by a pair of O-rings 80. The oil leaves the center of the shaft 31 through an outlet fitting 81 and is returned to the opposite end of the shaft 31 through a line or conduit 82, an oil reservoir 83, by operation of a pump 84 which circulates the oil under sufficient pressure to force it through the bearing spaces and to maintain the oil within the inner tube 31 at relatively high pressure as well as the oil filling the annular space 76 between the shaft 25 and the stationary shaft 31. The oil pressure is controlled by an adjustable needle valve 82a in the line 82.

The mounting of the shaft to provide the complete filling of the spaces between the stationary and rotatable shaft with oil under pressure and to maintain the pressure within the clearance within the bearings 75 and 77 at the ends of the rotating shaft effects a floating mounting of the rotating shaft and this mounting cushions the shaft and rotors against shock and vibration during operation. It has been found that during operation of a rotor such as illustrated in the drawings that even though the rotor is out of balance it operates smoothly with a minimum vibration of the equipment. The pump operates smoothly under all loads and precision balancing of the rotor has been found to be unnecessary. It appears from the operation of a rotor constructed in the manner illustrated in FIG. 5 that even with the long distance of shaft suspension between the mounting bearings that quick action and distortion of the rotation of the helical members is dampened to a degree that it becomes unnoticeable in the operation of the machine. By way of illustration and not by way of limitation, it has been found that in a system constructed as illustrated in the drawings, lubricating oil at a pressure of 125 pounds per square inch delivered to the shaft 31 provided effective lubrication and damping and minimizes the effects of off-balance masses on the rotor.

Figure 6:
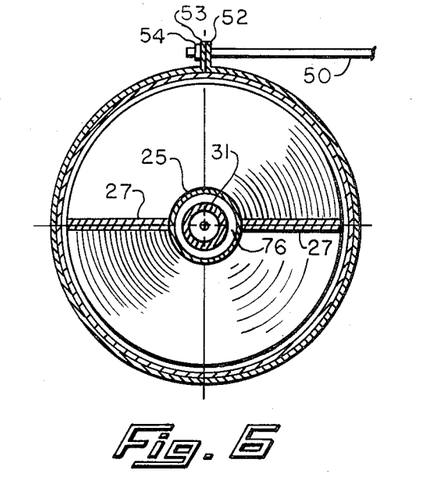
FIG. 6 is a sectional view taken along the line 6—6 of FIG. 4.
Figure 7:
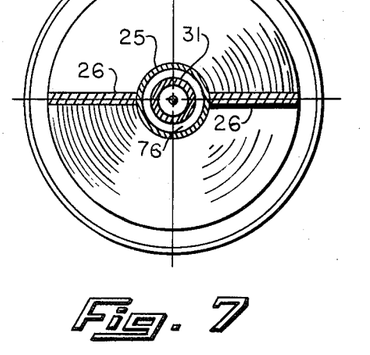
FIG. 7 is a sectional view taken along the line 7—7 of FIG. 4.
Figure 8:
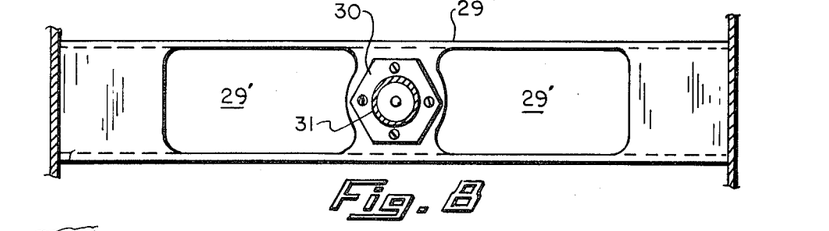
FIG. 8 is an enlarged longitudinal view of a rotor support of the pump of FIG. 1.

The rotors 26 and 27 as shown in FIGS. 7 and 6, respectively, each comprise double helices arranged at 180° from one another. In this way, they employ a longer pitch for each helix with a spacing of one-half the pitch distance between adjacent turns of the two helical elements. This double helix arrangement facilitates good balance of the rotors and also provides balanced action on the fluids circulated by the rotors.

Figure 9:
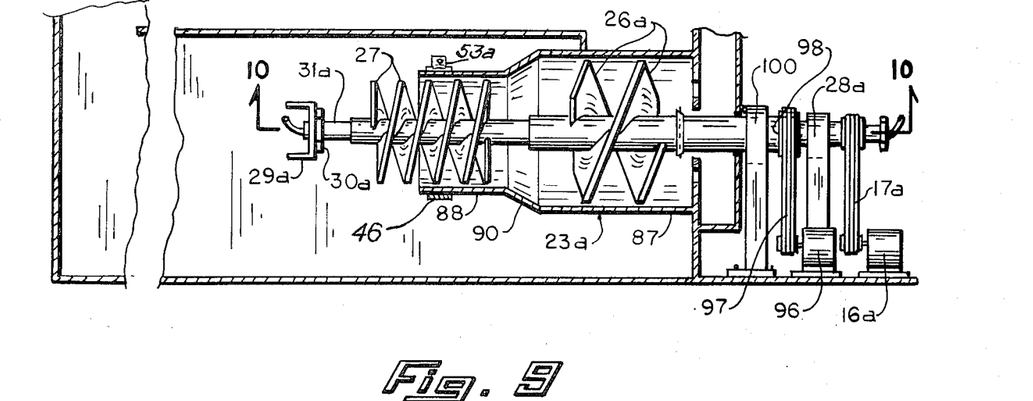
FIG. 9 is a longitudinal section view illustrating another embodiment of my invention.

The pump rotor assembly indicated in FIG. 9 is similar to that of FIG. 1 and corresponding parts have been designated by the same numerals with the suffix letter *a*. The construction of FIG. 9 differs from that of FIG. 1 in that the shroud 23*a* is formed to provide a large diameter intake chamber section 87 and a smaller diameter vortex helix section 88, the two sections of the shroud being cylindrical and being connected by a conical wall member 90.

Figures 10, 11, 12:
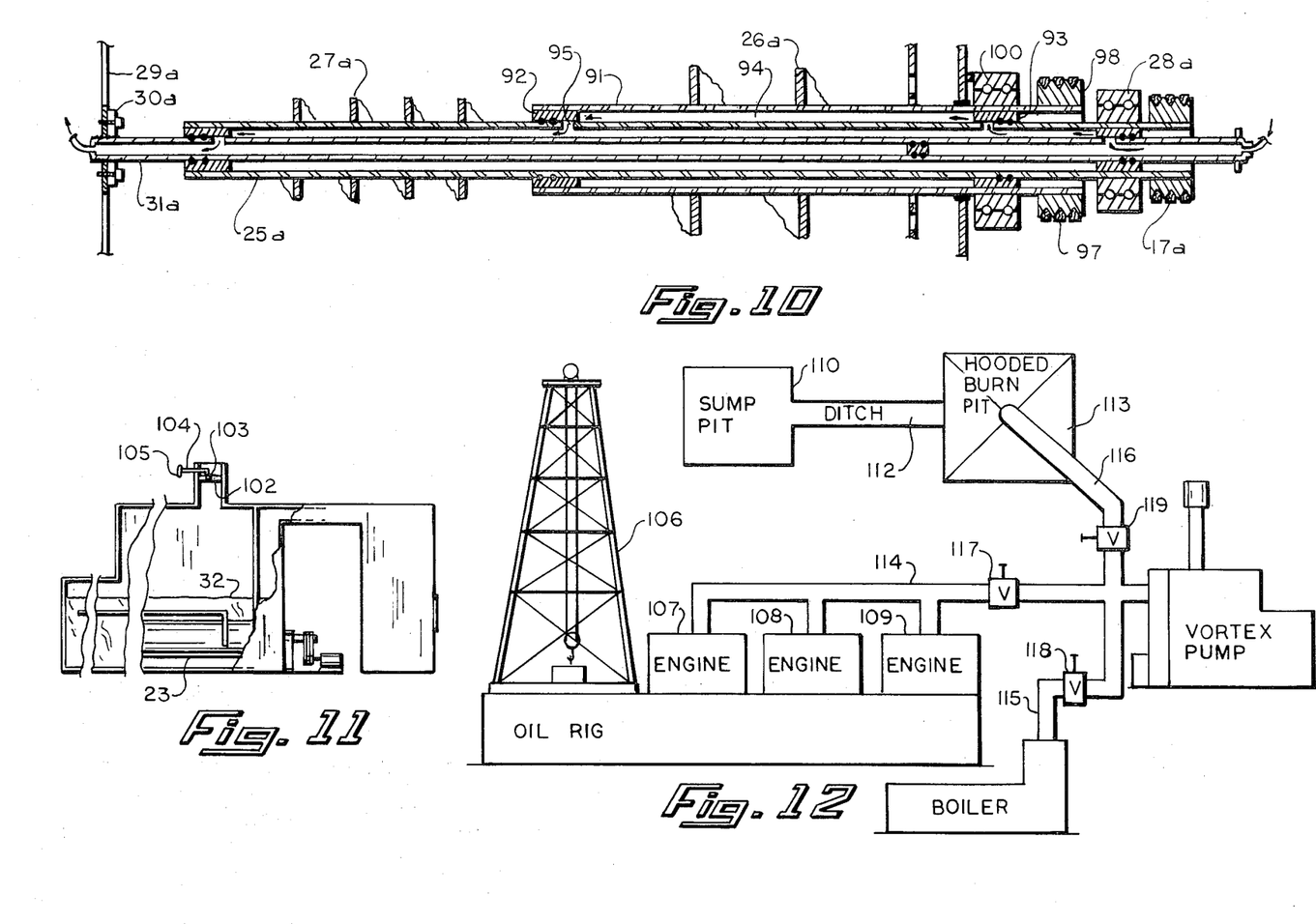
FIG. 10 is a longitudinal section taken along the line 10—10 of FIG. 9.
FIG. 11 is a somewhat diagrammatic side elevation view of the pump of FIG. 1 with a gas pressure regulating valve.
FIG. 12 is a diagrammatic illustration of an oil rig and associated equipment employing the invention.

The construction illustrated in FIG. 9 and shown in further detail in FIG. 10 further differs from that of the first embodiment in that the rotor elements 26*a* are mounted on an independent shaft 91 which rotates about the shaft 25*a* on bearings 92 and 93. Oil from the annular space 76*a* between the shafts 25*a* and 31*a* is admitted to an annular space 94 between the hollow shaft 91 and the hollow shaft 25*a* through an inlet 95 so that this space is filled with lubricating oil which flows into the inner spaces between the bearings 92 and 93 and the tube 25*a*. The shaft 91 is driven by a separate motor 96 which drives the shaft through V-belts 97 engaging a sheave or pulley 98. The shaft 91 is mounted in a thrust bearing 100.

The motors 16*a* and 96 may be arranged to be driven at different speeds so that an additional arrangement is provided for controlling the operation of the pump rotor. The relative sizes of the portions 87 and 88 of the shroud 23*a* are selected according to the application for which they are intended and for some applications, both in the first embodiment and in the embodiment of FIG. 9, it may be found desirable to provide a shroud wherein the shroud section of the intake chamber is of smaller diameter than the shroud section for the liquid vortex chamber.

FIG. 11 illustrates the apparatus of FIG. 1 provided with a pressure relief valve at the lower end of the stack 24. This valve comprises a weighted flapper valve or plate 102 which is eccentrically pivoted on a shaft 103 suitably mounted in the walls of the stack 24. The pressure of the gas rising through the stack 24 thus tends to pivot the valve in a counter-clockwise direction, because of the greater weight on the right-hand side of the flapper. In order to control the effective weight and thereby the pressure maintained by the valve, a rod 104 is provided extending through a slot in the side of the slot 24 and having an adjustable weight 105 which may be moved along the rod to change the balance of the valve. When the balance of the valve is changed in this manner the pressure in the tank below is changed accordingly and maintained at a different value as selected.

Figure 3:
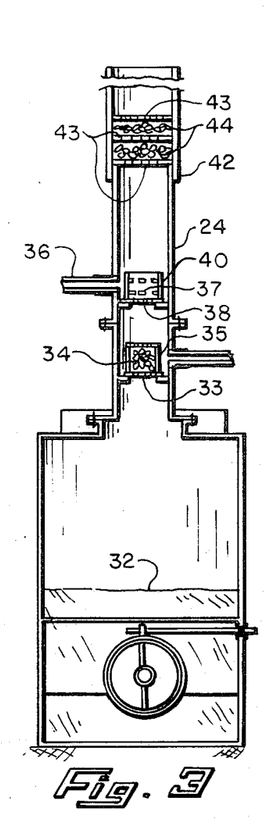
FIG. 3 is a sectional view taken along the line 3—3 of FIG. 2.

As indicated above the method and apparatus of this invention are effective for removing undesired constituents including noxious gases from a vapor stream. By way of example and not by way of limitation substantially pure sulphur was burned in an incinerator as illustrated in FIGS. 1, 2 and 3 and the vortex pump arranged as shown in these figures was operated to treat the resulting fumes. The following table indicates the results of this test.

Test No. 1 (Sulfur burn)

| Sampling point | Volumetric | Sulfur dioxide, parts per million by volume Deviation | Gravimetric |
|---|---|---|---|
| 1. In firebox at passage to rear at level of top of door 12 | 8061 | ±5% | 7030 |
| 2. In gas near pressure gauge 69 | 0 | ±0.2 ppm | 0 |
| 3. In stack above water drain 19 | 0 | ±0.2 ppm | 0 |

The vortex pump as illustrated and described above may be employed in a wide range of applications where the removal of impurities in products of combustion and other exhausted gases is essential. FIG. 12 illustrates the application of the vortex pump of this invention to an oil well drilling rig and the associated engines, boiler and refuse burning pit. As shown in this figure a derrick 196 together with three associated engines 107, 108 and 109 is further provided with a boiler used primarily in the winter for providing heat and a burning pit arranged to receive waste oils and burnables from a sump pit 110 through a ditch 112 and which is burned in a pit covered by a hood 113. The products of combustion from the engines, boiler and burning pit are connected through conduits 114, 115 and 116, respectively, to the intake of a vortex pump embodying my invention. The conduits 114, 115 and 116 are provided with shut-off valves 117, 118 and 119 respectively so that the vortex pump may be employed to remove and dispose of products of combustion and other vaporous substances received from any of the functioning components of the system. The vortex pump used in this manner prevents the discharge of noxious vapors and particulate matter from the entire well drilling rig and associated equipment.

Figures 13, 14:
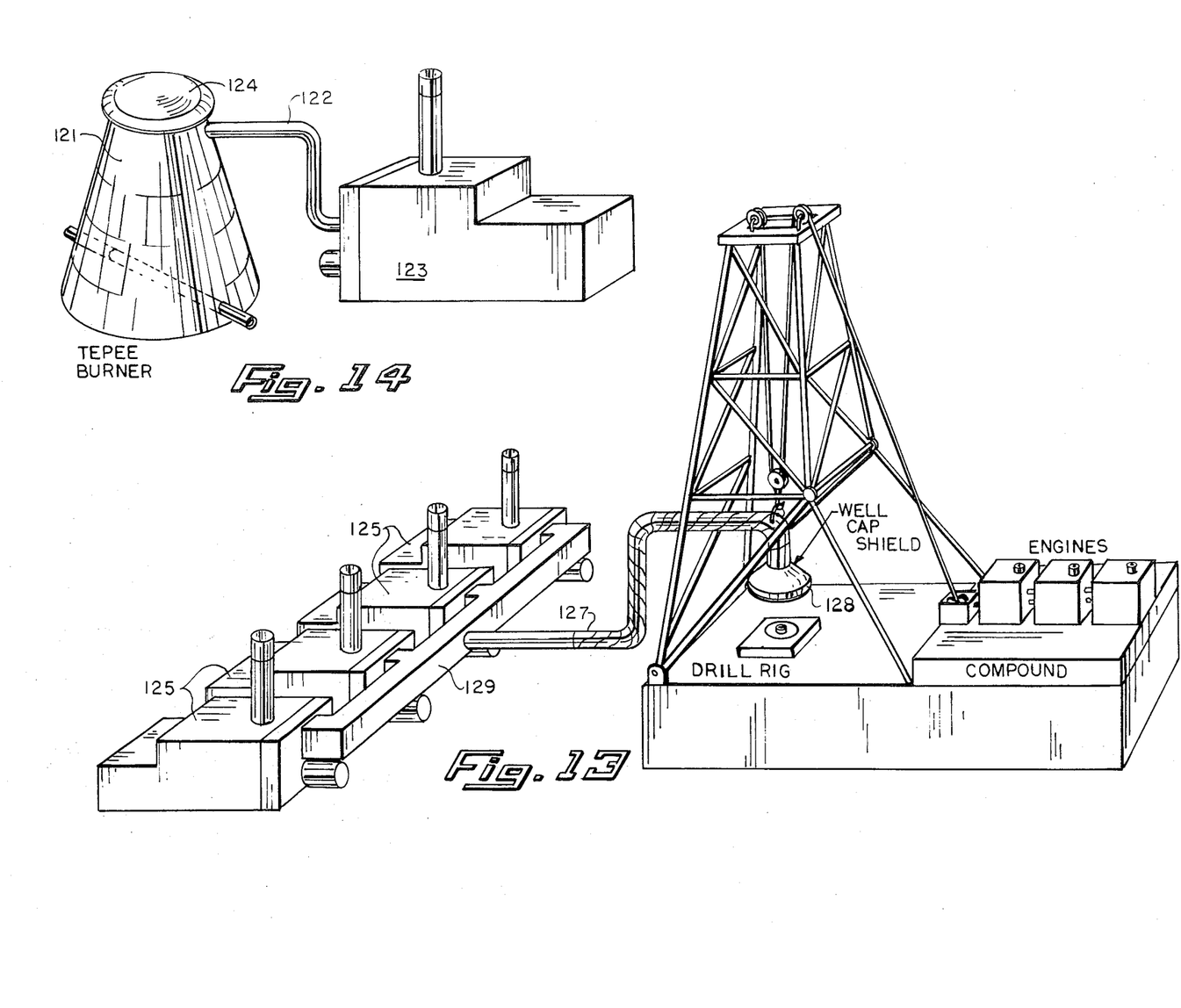
FIG. 13 is a diagrammatic view of an oil rig having pumps embodying the invention arranged for emergency use in the event the well goes out of control.
FIG. 14 is a diagrammatic view of an apparatus embodying the invention for use with a tepee or wigwam burner.

Another application of the vortex pump of this invention to the removal and elimination of smoke and the like is illustrated in FIG. 14 wherein a tepee or wigwam burner 121 provided at saw mills for burning of waste products such as bark, sawdust, slabs and other unused materials is connected through a conduit 122 to a vortex pump 123 embodying my invention. The top of the burner instead of being open to provide an exhaust for the products of combustion is closed by cap 124 and all of the products of combustion are removed through the conduit 122 and delivered to the vortex pump 123. The pump arranged in this manner prevents the discharge of particulate matter and undesired fumes generated within the burner.

A high capacity vortex pump or a battery of vortx pumps may also be employed for use when an oil well is out of control or on fire; FIG. 13 illustrates a battery of four vortex pumps arranged to be employed for this purpose. The four pumps indicated at 125 are connected through a manifold 125 to a relatively flexible conduit 127 having a hood 128 which may, in the event of emergency, be placed directly over the well. When the pumps are in operation a high capacity, high volume of gas and other material from adjacent the well head is drawn into the pumps through the manifold 126 and is collected in the pumps and the gaseous content purified in the manner described in connection with the embodiments above. When the oil is collected in the tanks of the pumps in this manner the tanks may be emptied periodically and the oil discharged to a storage tank.

Figure 15:
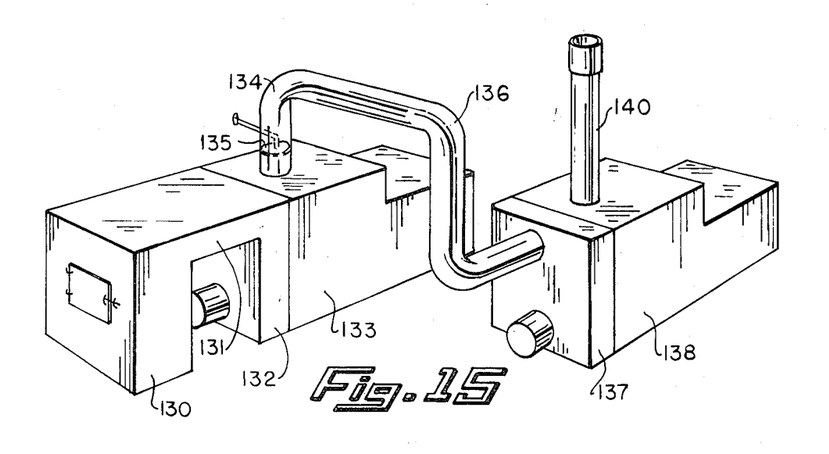
FIG. 15 is a diagrammatic view of an arrangement of two vortex pumps embodying the invention.

In some applications it may be desirable to operate two or more of the vortex pumps of this invention in tandem so that the vaporous substances discharged from the first pump may be purified further in the succeeding pumps. FIG. 15 illustrates the tandem arrangement of pumps for this purpose as employed with an incinerator 130 the products of combustion of which are discharged through horizontal duct 131 and vertical duct or manifold 132 to a vortex pump 133 of the construction illustrated in the first embodiment of the invention. The pump 133 is provided with a discharge stack 134 having a pressure regulator valve 135 and flows into a conduit 136 directly to the intake manifold 137 of a second pump 138. Here the gaseous discharge from the first pump 133 is purified and the final purified gases are discharged through a stack 140 of the pump 138. This arrangement of two pumps in tandem provides for the second treatment of gases discharged from one pump when the first pump discharge is not as well purified as desired. The discharge stack 140 of the second pump may be provided with the screens and treating liquid feed in the same manner as the pump of FIG. 1, 2 and 3. In the event that it becomes desirable because of the characteristics of the material being handled to provide still further purification, a third pump may be connected to the second pump in the same manner as the second pump is connected to the first, the purified stack then being provided on the third pump.

Figure 16:
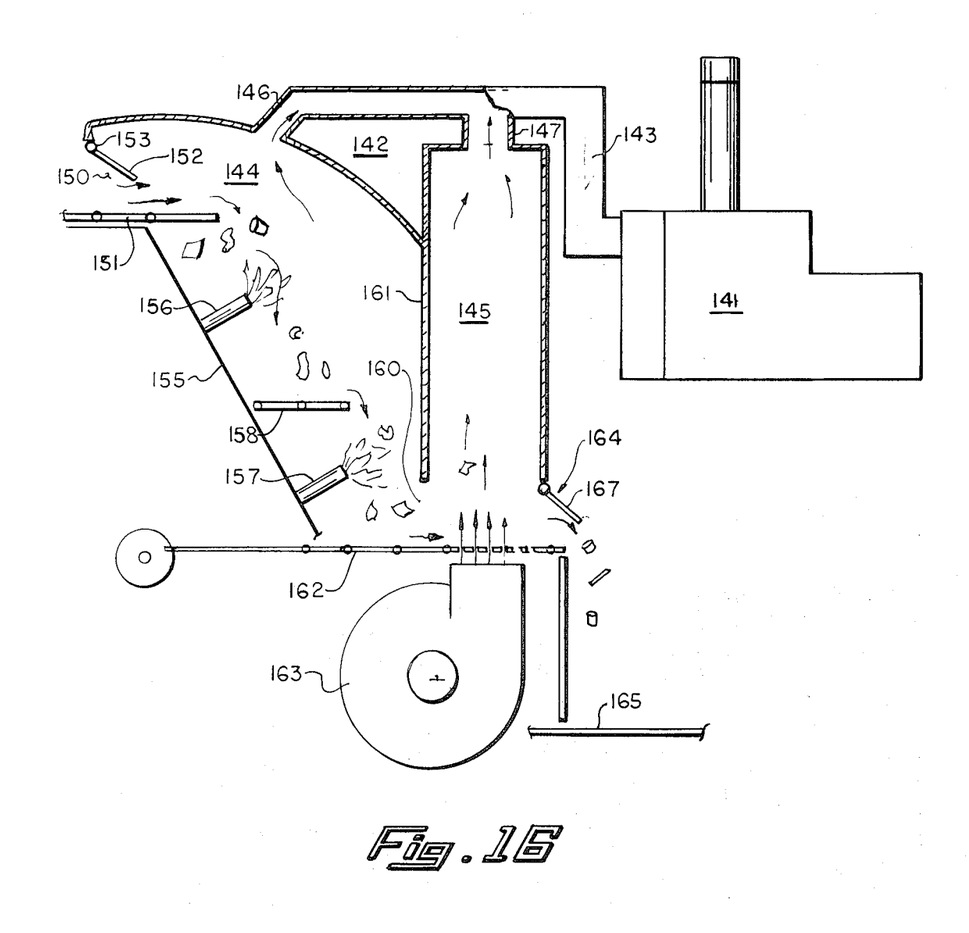
FIG. 16 is a diagrammatic view of a two-stage incinerator and vortex pump of the invention.

In FIG. 16 there is illustrated a two-state incinerator 142 arranged to discharge the products of combustion through a duct 143 to a vortex pump 141 embodying the invention. Incinerator 142 comprises a preheat section or chamber 144 and final burning section 145 connected in series for the feed of material to be burned and having their outlets 146 and 147, respectively, connected to the duct 143.

The preheater 144 comprises a generally sloping chamber having an intake 150 and a shaker conveyor 151 which discharges the material to be burned into the preheater chamber. A gravity biased door 152, hinged at 153 along the top of the opening 150 is provided to restrict the amount of air passing through the opening 150 to the preheat chamber. The lower wall of the chamber 144 is slanting as indicated at 155 and has mounted thereon gas burners 156 and 157 which operate to preheat the material falling through the preheat chamber and to reduce the oxygen content of the gas therein. To facilitate the movement of the material supplied to the preheat chamber a second shaker table 158 is provided in the lower zone of the chamber extending from the wall 158 and moves material falling thereon outwardly to the right for heating by the lower burner 157.

The heated material is supplied to the main combustion chamber 145 through an opening 160 at the bottom of the vertical wall 161 between the two chambers. The material which has been preheated in the chamber 144 is moved across the preheat chamber to the main chamber by a shaker table 162 which is provided with a multiplicity of perforations at its portion below the table 145 so that air for combustion purposes may be supplied to the chamber 145 by operation of a blower 163. The shaker table below the chamber 145 is of sufficient length that burnable materials are burned before they can leave the chamber 145, and pass to the right and out through an opening 164. The nonburnable articles and only the non-burnable articles fall to shaker table 165 so that they may be removed as desired. In order to maintain the required gas pressures within the burning chambers a flap door which is gravity biased to close the opening 164 is provided as indicated at 167. When employing a single pump 141 as illustrated the openings 146 and 147 are sized so that the opening 146 is more restricted and the major flow of combustion products is upwardly through the opening 147 to the pump.

The operation of the two-stage incinerator as illustrated in FIG. 16 provides intense heating of the materials flowing through the preheat chamber and dries these materials substantially so that heated materials are supplied to the main incinerator chamber 145 which is provided with an ample flow of oxygen to support combustion and burn the preheated materials as desired. A two stage incinerator constructed in this manner provides for continuous incineration of material and, at the same time, by employing the vortex pump 141 eliminates particulate matter and noxious fumes from the gases discharged from the incinerator.

In all of the applications of the vortex pump of this invention for the purpose of removing noxious fumes and particulate matter from combustion products and the like the removed materials collect in the water in the pump tank. The particulate matter, depending upon its characteristics, may be collected as a sludge from the bottom of the tanks or removed as agglomerated floating material from the surface of the water and this material may thus be disposed of without pollution of the atmosphere. In the same manner when various substances are removed by the scrubbing process in the discharge stacks the major portion of the removed material is returned to the main tank and treated therein. Replacement of the charcoal briquettes or the like may be desirable from time to time, however the stack may be operated over long periods of time without requiring servicing.

I claim:

1. A gas cleaning system comprising:

a vacuum pump of the liquid vortex type, said pump including a supporting structure having mounted thereon a rotor having a shaft and first and second helical fluid propelling members secured thereon and spaced from one another and an enclosing casing means attached to said structure, said casing being closed at one end and including a cylindrical shroud open at the other end and concentric with said rotor and spaced from and enclosing at least a portion of said first helical member, said second helical member being arranged in said casing and spaced from the closed end thereof for providing an intake chamber;

means including a container for maintaining said pump immersed in a body of liquid said casing being positioned below the level of liquid in said container;

means for admitting to said intake chamber the gas to be cleaned;

means for admitting liquid to said intake chamber and for mixing the liquid with the gas in said intake chamber;

means for driving said rotor and utilizing said helical members for circulating fluids toward the open end of said casing and for creating a low pressure in said intake chamber; said first helical member creating a vortex in the liquid in said shroud and said second helical member delivering the mixed gas and liquid to the vortex;

means in said container for collecting a volume of cleaned gas in contact with the surface of said body of liquid; and means communicating with said container for discharging gas from said volume of gas.

2. A gas cleaning system as set forth in claim 1 including means for maintaining said volume of gas at a pressure above atmospheric pressure.

3. A gas cleaning system as set forth in claim 1 including means for delivering liquid and chemical treating agents to said inlet chamber.

4. A gas cleaning system as set forth in claim 1 wherein the shaft of said rotor is hollow and concentrically mounted about a fixed shaft on bearings located near the ends of said rotor and including:
sealing means between said rotor shaft and said fixed shaft axially outwardly of said bearings, and
a combined lubricating and damping means for circulating lubricating fluid under pressure through said bearings and for filling the annular space between said shafts whereby said outer shaft tends to float on said fixed shaft and facilitates the free rotation of said rotor shaft about said fixed shaft.

5. A gas cleaning system as set forth in claim 1 wherein said means for mixing gas and liquid in said intake chamber comprises an annular ring on said rotor shaft within said chamber and means for injecting liquid into said chamber axially of said shaft and against said ring.

6. A gas cleaning system as set forth in claim 1 wherein said enclosing casing means is of different cross sectional areas about said first and second helical members.

7. A gas cleaning system as set forth in claim 1 wherein said pump immersing container means includes a closed tank containing said body of liquid and comprising:
means including an overflow outlet for maintaining said body of liquid at a predetermined level; and
a generally horizontal baffle arranged in said tank above the body of liquid and extending over the discharge end of said pump.

8. A gas cleaning system as set forth in claim 1 wherein said second rotor is rotatable independently of said first rotor and including independent driving means for each of said rotors whereby the speeds of said rotors may be different.

9. A gas cleaning system as set forth in claim 1 including a plurality of sources of gaseous material to be treated and respective conduits for connecting each of said sources to the intake chamber of said pump, and a respective valve in each of said conduits for connecting any selected number of said sources to said pump for treatment of the gaseous material flowing from the selected sources.

10. A gas cleaning system as set forth in claim 1 including means for conducting liquid from said body of liquid to the interior of said shroud adjacent the intake end of said first helical member.

11. A gas cleaning system as set forth in claim 10 including means for adjusting the rate of flow of liquid through said conducting means.

12. A gas cleaning system as set forth in claim 1 including:
a stack for removing purified gases from said container;
a fluid mixing member in said stack, said mixing member comprising a plurality of spaced flat foraminous elements and a multiplicity of bodies of solid material in the space between said elements; and
means for circulating liquid over said elements upwardly through said mixing member for scrubbing the gas discharged from said container.

13. A gas cleaning system as set forth in claim 12 including:
means for circulating treatment fluids through said mixing member for removing predetermined constituents from the gas passing through said stack; and
means for delivering overflow liquid from said stack to said intake chamber.

14. A system for cleaning streams of gaseous material comprising:
a closed tank for holding a body of liquid therein and gas in the tank above the liquid;
means for compressing the stream of gaseous material to be treated and for mixing the gaseous material intimately with the body of liquid in said tank and for maintaining a gas pressure in said tank higher than atmospheric pressure;
means including a treating stack connected with said tank for discharging gas therefrom;
means in said stack utilizing the pressure and velocity of the discharged gas for maintaining a column of liquid in said stack; and
means for defining the maximum height of the column of liquid in said stack.

15. A system for cleaning streams of gaseous material as set forth in claim 14 wherein said pressure utilizing means comprises:
a plurality of spaced foraminous elements extending across said stack, and
a multiplicity of bodies of solid material in the space between said elements.

16. A system for cleaning streams of gaseous material as set forth in claim 14 including means for supplying treatment fluids to said stack for circulation with the liquid therein for removing predetermined constituents from the gaseous material circulating through said stack.

17. The system for cleaning streams of gaseous material as set forth in claim 16 including means for conveying liquid from said stack to the body of liquid in said tank.

18. A gas cleaning system comprising first and second vacuum pumps of the liquid vortex type connected in tandem for treating gas in two successive steps, each of said pumps comprising:
a supporting structure having mounted thereon a rotor having a shaft and first and second helical fluid propelling members secured thereon and spaced from ane another and an enclosing casing means carried by said structure, said casing being closed at one end and including a cylindrical shroud open at the other end and concentric with said rotor and spaced from and enclosing at least a portion of said first helical member, said second helical member being arranged in said casing and spaced from the closed end thereof for providing an intake chamber;
means for maintaining said pump immersed in a body of liquid;
means for admitting to said intake chamber the gas to be cleaned;
means for admitting liquid to said intake chamber and for mixing the liquid with the gas in said intake chamber;

means for driving said rotor and utilizing said helical members for circulating fluids toward the open end of said casing and for creating a low pressure in said intake chamber, said first helical member creating a vortex in the liquid in said shroud and said second helical member delivering the gas and liquid to the vortex;

means for collecting a volume of cleaned gas in contact with the surface of said body of liquid; and means for discharging gas from said volume of gas, said first pump having its gas discharge means connected to conduct gas to the intake chamber of said second pump, and said second pump including an outlet stack and a liquid filled gas treating column therein, the liquid in said column being maintained in said stack during operation of said second pump by the pressure and velocity of gas discharged through said stack.

19. A vacuum pump of the liquid vortex type comprising:

a housing and means for maintaining a body of liquid at a predetermined level therein;

a rotor assembly mounted in said housing, said rotor comprising a shaft and first and second helical fluid propelling members mounted thereon and spaced from one another;

a casing secured in said housing and surrounding said rotor and said means for closing the end of said casing against said second member and providing a gas inlet chamber;

the portion of said casing about said first member being cylindrical and concentric about said shaft and spaced radially from said first member;

intake means for admitting gaseous fluid to the inlet chamber about said second member;

means for admitting liquid to said casing near the intake end of said first member;

means for driving said rotor and for producing a liquid vortex about said first member and utilizing said second rotor to drive gaseous fluid into the vortex;

means for collecting a volume of gas in said housing above the liquid therein; and means for discharging gaseous fluid from the volume of gas above the body of liquid.

20. A vacuum pump of the liquid vortex type as set forth in claim 19 including means for maintaining said volume of gas at a pressure above atmospheric pressure.

21. A vacuum pump of the liquid vortex type as set forth in claim 19 including means for conducting liquid from said body of liquid to the interior of said shroud adjacent the intake end of said first helical member.

22. A vacuum pump of the liquid vortex type as set forth in claim 19 including means for adjusting the rate of flow of liquid through said conducting means.

23. A vacuum pump of the liquid vortex type as set forth in claim 19 wherein the shaft of said rotor is hollow and concentrically mounted about a fixed shaft on bearings located near the ends of said rotor and including:

sealing means between said rotor shaft and said fixed shaft axially outwardly of said bearings; and a combined lubricating and damping means for circulating lubricating fluid under pressure through said bearings and for filling the annular space between said shafts whereby said outer shaft tends to float on said fixed shaft and facilitates the free rotation of said rotor shaft about said fixed shaft.

24. A vacuum pump of the liquid vortex type as set forth in claim 19 wherein said second rotor is rotatable independently of said first rotor and including independent driving means for each of said rotors whereby the speeds of said rotors may be different.

25. A method for cleaning a stream of gas to remove solid matter and undesired constituents therefrom which comprises:

first introducing a liquid into the stream of gas and mixing the liquid and gas in the stream of gas;

providing an enclosure and a body of liquid in the enclosure;

producing a liquid vortex and directing the vortex into said body of liquid;

then compressing the mixed stream of gas and liquid upstream of the vortex and injecting it axially into said liquid vortex centrally thereof for effecting the intimate intermingling of the gas into the body of liquid and agitating the body to effect an intimate intermingling of gas with the body of liquid and the transfer of particulate and gaseous foreign matter to the liquid;

thereafter collecting cleaned gas above the level of liquid in the enclosure; and exhausting cleaned gas from the enclosure.

26. The method of claim 25 including the step of maintaining a pressure of the gas in the enclosure greater than atmospheric pressure.

27. The method of claim 26 wherein the steps of compressing and injecting the streams of gas and liquid comprise:

producing a liquid vortex and directing tbe vortex into said body of liquid;

compressing the mixed stream of gas and liquid and delivering the mixed stream to said liquid vortex for effecting the intimate intermingling of the gas in the body of liquid; and utilizing the liquid vortex for effecting said step of maintaining a gas pressure higher than atmospheric.

28. The method of claim 26 including the steps of providing a container having a mass of gas cleaning material therein; and directing gas from the enclosure over the material in the container to effect further cleaning thereof.

29. The method of claim 28 wherein the material includes a liquid and is an upright column and including the step of utilizing the gas discharged from the enclosure for maintaining the liquid in suspension in the upright column.

30. The method of claim 29 wherein the steps of compressing and injecting the stream of gas and liquid comprise:

producing a liquid vortex and directing the vortex into said body of liquid;

compressing the mixed stream of gas and liquid and delivering the mixed stream to said liquid vortex for effecting the intimate intermingling of the gas in the body of liquid.

* * * * *